MAGNETIC MEMORY CIRCUIT

Filed June 28, 1960

INVENTOR
J. L. ROGERS
BY
William H. Kamtia
ATTORNEY

United States Patent Office 3,011,158
Patented Nov. 28, 1961

3,011,158
MAGNETIC MEMORY CIRCUIT

John L. Rogers, Hermosa Beach, Calif., assignor to Bell Telephone Laboratories, Incorporated, New York, N.Y., a corporation of New York Filed June 28, 1960, Ser. No. 39,403
8 Claims. (Cl. 340—174)

Figure 1:
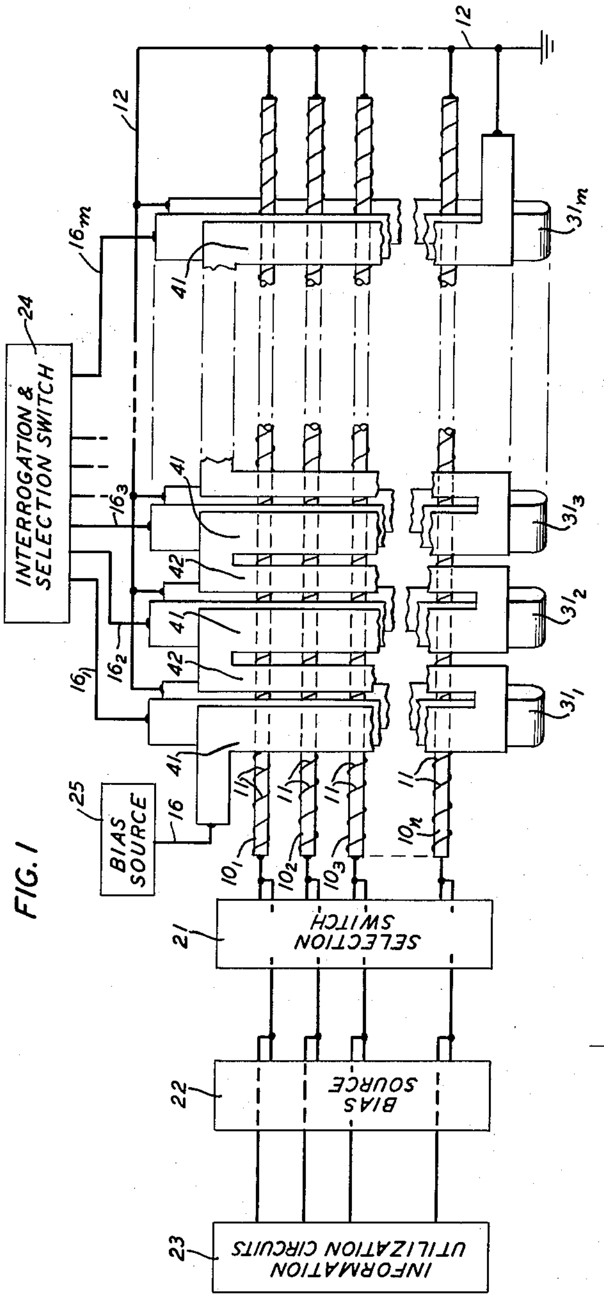

This invention relates to magnetic memory circuits and more particularly to such circuits employing magnetic wire memory elements.

Memory matrices utilizing toroidal magnetic cores, or variations thereof, having substantially rectangular hysteresis characteristics are well known and have advantageously found wide application wherever information in binary form must be temporarily or permanently stored and must also be readily accessible. However, a number of problems arise in connection with use of the conventional magnetic core memory matrix. Thus, for example, problems of fabricating the matrix and of wiring the individual cores arise. Furthermore, although it is frequently necessary to reduce the circuit components to minimal dimensions, the requirement of winding and threading the cores by a number of, and frequently many, conductors results in a limiting dimension below which a toroidal core is not conveniently reducible. The above problems can advantageously be greatly diminished by utilizing magnetic wire elements such as those described, for example, by A. H. Bobeck in the copending application Serial No. 675,522, filed August 1, 1957, rather than the conventional toroidal magnetic cores.

Information is stored in the magnetic wire element in the form of polarized magnetizations of a helical flux path axially coincident with the memory wire. The helical flux path associated with the memory wire may be established, for example, by twisting a suitable magnetic wire or, advantageously, by wrapping a magnetic tape helically about a nonmagnetic center conductor. The information stored in a particular bit address defined along the memory wire is determined by the magnetic polarization of that portion of the helical flux path associated with the particular bit address. The direction of polarization is determined by the magnitude and direction of the selection fields. Axial selection fields may be generated by current passing through a solenoid concentric with the memory wire while circular fields may be generated by passing current down the memory wire itself. By adjusting each field so that it alone is insufficient to affect the direction of magnetization while their vector sum exceeds the threshold required for reversing the direction of magnetization, coincident current selection is advantageously achieved. Of course, a large enough axial or circular field can be used alone for flux reversal and the reading out of stored information may advantageously be accomplished by utilizing a single large axial field. The memory wire is thus used as both the storage medium and as one of the access wires and may additionally serve as the sense wire since it "senses" a change in the direction of the magnetic flux and the voltage thereby induced is propagated to sensing amplifiers.

Many bits of information may be stored along each memory wire of a typical magnetic memory array with each bit address being separated from an adjacent bit address by a buffer region on the wire. The storage density ordinarily obtained represents a compromise between drive currents, output signals, and demagnetizing factors. For optimum operation of a magnetic wire memory array, the hysteresis characteristics of the various bit addresses should ideally be of the square loop type, substantially identical, and should not change appreciably during the operation of the array. The hysteresis characteristic of a bit address is affected, however, by the length of the address and by the magnetic condition of adjacent buffer regions. Thus it has been found that a decrease in the length of an address decreases the squareness of its hysteresis loop. Even though bit addresses of a length sufficient to have satisfactory hysteresis characteristics are provided, the magnetic conditions of the addresses may be substantially affected as a result of changes in the magnetic states of the buffer regions between bit addresses. The buffer regions are magnetically unstable partially because they are substantially shorter in length than are the bit addresses and thus have hysteresis characteristics which are less square than are those of the bit addresses. However, it is advantageous to keep the lengths of the buffer regions as short as possible since increases in the lengths of these regions cause an increase in attenuation and delay time of the output signal and an overall increase in the size of the memory. Furthermore, it has been found that, independent of the length of the buffer regions, local demagnetizing fields near the ends of the buffer regions may cause portions of the buffer regions to switch responsive to selection currents applied to the memory wires. Upon partially switching, the buffer region has adverse effects upon the magnetic properties of the adjacent bit addresses. Thus, for example, the rectangularity of the hysteresis loops of adjacent bit address segments may be appreciably changed by flux excursions in the buffer region. Thus it is advantageous to maintain the buffer regions in uniform predictable magnetic conditions throughout the operation of the memory array thereby reducing such adverse effects upon the magnetic properties of the bit addresses caused by changes in the magnetic condition of the buffer regions.

Therefore, it is an object of this invention to minimize the magnetic effect of the buffer regions upon the magnetic properties of the bit addresses defined along a wire memory element.

It is a further object of this invention to obtain a greater storage density of information along a magnetic memory wire than heretofore realizable.

It is a still further object of this invention to provide a new and improved memory array utilizing magnetic memory wires.

The above and other objects are realized in one embodiment according to the principles of this invention comprising an array of magnetic wire memory elements wherein the buffer regions between bit addresses of the memory wire are biased to insure that these regions remain in uniform magnetic conditions. The biasing is accomplished by means of flat conducting strips, which may advantageously be serially connected in a zigzag pattern, placed in close proximity to one side of each plane of a multiplane magnetic wire memory array. The zigzag circuit has alternate broad and narrow strips with the broad strips superimposed on the bit addresses and the narrower strips superimposed on the buffer regions. Direct current applied to the zigzag circuit provides a magnetic field on the bit addresses which is advantageously employed in cooperation with a direct bias current applied to the memory wires to establish a particular operating point on the hysteresis loops of the memory elements at the bit addresses. The buffer regions are subjected to a field caused by the current in the narrower strips of the zigzag circuit which opposes the direction of the field produced by the direct bias current applied to the memory wires. The buffer regions are therefore biased to a lesser degree by the two combined biasing fields than are the bit addresses. Thus, while the bit addresses are biased to prevent any switching responsive to half-select currents and to achieve wider operating margins, the buffer regions are driven to a magnetic condition which still permits them to be switched by half-select currents. The simultaneous complete switching of all of the buffer regions of a memory wire as a result of the application of a half-select current to that memory wire eliminates the danger of partial switching of some or all of the buffer regions responsive to half-select currents and the deleterious effects upon the magnetic properties of the bit addresses caused thereby. In addition, since the two applied biasing currents produce fields each biasing the bit addresses in the same direction, the presence of the field produced by the zigzag current allows a smaller direct bias current to be utilized than would otherwise be possible.

Thus, according to one feature of this invention, a zigzag shaped conductor is positioned in close proximity to one side of each plane of a multiplane magnetic wire memory array in alignment with the rows of information bit addresses and separating buffer regions therein.

According to another feature of this invention, strip solenoids inductively coupled to each memory wire of a particular plane of memory wires are positioned more closely together than heretofore possible, thus enabling a greater density of information to be stored on each memory wire.

According to still another feature of this invention, direct current is applied to the memory wires of a magnetic wire memory array to generate magnetic fields which cooperate at the bit addresses with the fields caused by currents in a zigzag conductor placed in close proximity to the array to bias the bit addresses to predetermined operating points on the hysteresis loops of the wire memory elements.

Figure 2B:
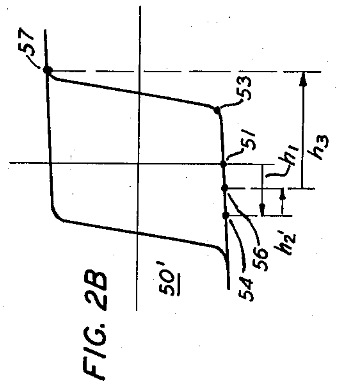
Figure 2A:
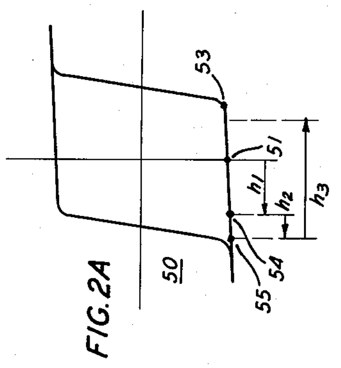

The foregoing and other objects and features of this invention will be more clearly understood from a consideration of the detailed description of one illustrative embodiment thereof which follows when taken in conjunction with the accompanying drawing in which:

FIG. 1 depicts one plane of an illustrative magnetic wire memory array according to the principles of this invention and further depicts the relationship of a zigzag biasing conductor to the memory wires of a particular plane of the array;

FIG. 2A depicts an idealized hysteresis characteristic loop of a magnetic material from which a magnetic wire element employed in connection with this invention may be fabricated and further depicts the effects of the various biasing fields utilized in the operation of this invention upon the bit addresses of the magnetic wire element; and FIG. 2B also depicts an idealized hysteresis characteristic loop of a magnetic material from which a magnetic wire element employed in connection with this invention may be fabricated and depicts the effects of the various biasing fields upon the buffer regions of the magnetic wire element.

The illustrative memory array shown in FIG. 1 constitutes one plane of a multiplane memory array and comprises a plurality of wire memory elements $10_1$ through $10_n$. The latter elements 10 each has a helical magnetic flux path axially coincident therewith which, in the illustrative embodiment of this invention being described, is provided by a magnetic tape 11 wrapped around the wire memory element. Wire memory elements of the character contemplated herein and their principles of operation are described in detail in the copending application of A. H. Bobeck referred to hereinbefore. Each of the wire memory elements 10 is connected at one end to a ground bus 12 and at the other end to a coincident current selection switch 21. The wire memory elements 10 are also connected at their other ends to a bias current source 22 and, since this end of each of the elements 10 may conveniently be employed as an output end in accordance with the advantageous operation of such elements, they are also connected at this end to information utilization circuits 23.

Strip solenoids $31_1$ through $31_m$ encircle the wire memory elements 10 and are inductively coupled thereto on both sides of the plane as depicted in FIG. 1. The solenoids 31 are connected at one end to the ground bus 12 and at the other end to a second coincident current selection switch 24 which switch 24 includes circuitry for also providing interrogation currents. The solenoids 31, in a manner well known in connection with wire memory element arrays generally, define on the elements 10 a coordinate array of information addresses. Since the memory array of FIG. 1 being described is understood to be word-organized, the solenoids 31 each define a word row, the individual corresponding characters of the words being defined by the elements 10. The information addresses defined as segments on the elements 10 by the solenoids 31 are separated thereon by buffer segments to provide the desired isolation of the address segments. The necessity of providing such a buffer region between bit addresses has been generally discussed hereinbefore. The length of the buffer regions is thus determined by the degree of interaction existing between the bit addresses during writing and interrogation and is generally peculiar to particular memory arrays.

In addition to the solenoids 31, electrically conducting strips 41 are also coupled to the address segments defined on the wire elements 10 in correspondence with the solenoids 31. Similarly, electrically conducting strips 42 alternating with the strips 41 are coupled to the buffer segments between each of the address segments. The strips 41 and 42, which may be disposed in close proximity to, but insulated from, one side of the solenoids 31, are serially connected together in zigzag fashion and may advantageously be stamped from a single sheet, portions being removed from either side of the sheet to form the alternating conducting strips 41 and 42. One end of the continuous conductor formed of the alternating strips 41 and 42 is connected to the ground bus 12, the other end being connected to another bias current source 25.

The selection switches 21 and 24 may comprise any well-known switches capable of selectively providing current pulses of the character to be described hereinafter and accordingly need not be described in further detail herein. Similarly, the bias current sources 22 and 25, since they are also readily devisable by one skilled in the art, need only to be described to the extent of specifying the character of the direct currents provided thereby. The information utilization circuits 23 will comprise associated circuitry capable of detecting readout signals of the character to be described, of the information handling system of which the present invention may advantageously comprise a part. Since the details of none of the foregoing circuits are essential to a complete understanding of the present invention they are shown in block symbol form in the drawing.

In many magnetic memory arrays address selection for writing purposes is accomplished by the well-known coincident current technique. In this mode of selecting an information address by means of two coincident half-select currents, the application of one of the half-select currents to a memory element must be insufficient to drive the element past the knee of the hysteresis loop while the application of both half-select currents to the element must be sufficient to drive the element past the knee to a point of opposite saturation. It is obvious that for satisfactory coincident current operation the application of the coincident currents must always drive the address to the point of opposite saturation while the application of but one of the currents must never allow the address to be driven past the knee of the hysteresis loop. However, currents producing satisfactory results for a particular bit address of a magnetic memory wire array may not always be satisfactory for other bit addresses of the array because of a lack of uniformity sometimes found in the hysteresis characteristics of bit addresses of the magnetic memory wires. Furthermore, even when there is sufficient uniformity to allow satisfactory operation for a particular magnitude of drive current, the operating margins are often quite narrow thus allowing little leeway in permissible values of selection currents. However, it is known that these disadvantages attending the problem of nonuniform hysteresis characteristics can be substantially reduced by the application of a biasing magnetic field to the bit addresses to establish new magnetic operating points therefor. This may be achieved by the application of a direct biasing current to the memory wires. The initial magnetic condition of the bit addresses will then be represented by a new operating point such as the point 55 on the hysteresis loop 50 shown in FIG. 2A, rather than the remanent point 51, and consequently larger selection currents will be necessary for coincident current operation. The amount of biasing required to insure proper switching responsive to the application of the coincident currents will normally depend upon the relative uniformity of the hysteresis characteristics of the bit addresses utilized in a particular array.

The present invention will now be further described by a discussion of an exemplary operation of the illustrative embodiment shown in FIG. 1. A word is written into the array by the application of coincident currents from the selection switches 21 and 24. The particular word row selected is determined by the application of a coincident half-select signal of the proper polarity from switch 24 to a particular one of the solenoids 31, while the particular binary bits to be written into the information addresses of that word are determined by the application of coincident half-select signals of particular polarities from switch 21 to the memory wires 10. Stored information in the form of magnetizations of one or the other polarity is subsequently interrogated a word at a time by the application of full-select signals from the switch 24 to the solenoids 31. The full-select interrogation signal from switch 24 will, of course, be of an opposite polarity from the previous half-select signal from switch 24. The interrogation signal causes the bit addresses previously set by the coincident selection signals to switch back to their previous magnetic condition which switching in turn causes signals to be induced in those memory wires 10. The interrogation is then completed by the detection of the induced signals by the information utilization circuits 23.

The biasing of the bit addresses, discussed hereinbefore, is accomplished in part by means of a direct biasing current applied to the memory wires from the bias source 22. For coincident current selection it is advantageous that the bit addresses be biased to an operating point such as the point 55 on the hysteresis loop 50 of FIG. 2A.

However, as discussed previously, adverse effects upon the magnetic properties of the bit addresses caused by nonuniform changes in the magnetic condition of the buffer regions can advantageously be eliminated by keeping all of the buffer regions in substantially uniform magnetic conditions throughout the operation of the memory array. Substantial control over the magnetic conditions of the buffer regions may be assured by the application of a biasing magnetic field acting on the buffer regions. The electrically conducting strips 41 coupled to the bit address segments defined on the wire elements 10 by the solenoids 31 and the electrically conducting strips 42 coupled to the buffer regions are advantageously utilized to apply the biasing magnetic field to the buffer regions. The strips 41 and 42 are serially connected at alternate ends to form a zigzag pattern. Furthermore, a direct biasing current is transmitted to the conductors 41 and 42 from the bias source 25. Because of the zigzag pattern of the serially connected conductors 41 and 42, current flow in the conductors 41 produces a magnetic field of one direction in the regions in proximity to the bit addresses and current flow in the conductors 42 produces a magnetic field of the opposite direction in the regions in proximity to the buffer regions. The direction of the field over the buffer regions is such that it diminishes the bias on the buffer regions produced by the bias source 22, while the direction of the field over the bit addresses tends to increase the bias provided by source 22. The increase in the bias on the bit addresses allows the utilization of a smaller direct bias current from source 22 than would be necessary if source 22 were the only source of biasing fields acting on the bit addresses. The direct biasing field from source 22 tends to drive both the bit addresses and the buffer regions to the point 54 on the loops 50 and 50′ of the respective FIGS. 2A and 2B. This direct biasing field and its direction is represented on both figures by the arrow $h_1$. However, the biasing field provided by the current on the conductors 41 and 42 tends to drive the bit addresses from the point 54 to the point 55 on the loop 50 of FIG. 2A and to drive the buffer regions from the point 54 to the point 56 on the loop 50′ of FIG. 2B. These biasing fields and their directions are represented on FIG. 2A and FIG. 2B by the arrows $h_2$ and $h_2'$ respectively. Thus the vector sums of the applied biasing fields drive the bit addresses and buffer regions to the points 55 and 56, respectively, of the loops 50 and 50′ of FIGS. 2A and 2B. The application of a half-select signal from the switch 21 to a bit address is insufficient to drive the bit address past the knee 53 of the loop 50, while the application of a half-select signal from the same switch to a buffer region is now sufficient to drive the buffer region past the knee 53 to the point of opposite saturation 57 on the loop 50′. The drives applied to the bit addresses and buffer regions by the foregoing half-select currents and their directions are shown by the arrows $h_3$ in FIGS. 2A and 2B. By biasing the buffer regions so that all of these regions switch completely as a result of the application of a half-select current, the partial switching of some or all of the buffer regions and the attendant nonuniform effects upon the magnetic properties of the bit addresses are prevented.

The embodiment of this invention and the physical relationships of its components are to be understood as exemplary only of the principles of this invention. Thus the dimensions have been exaggerated in the drawing for purposes of description. Furthermore, the direct biasing current applied to the conductors 41 and 42 of this invention need not be of the polarity assumed in the foregoing description. The application of a biasing signal of the opposite polarity would in that case make the total biasing field on the buffer regions greater than that on the bit addresses. Partial switching of the buffer regions responsive to half-select signals is then entirely prevented. The other aspects of this invention described herein are also to be considered as illustrative, and numerous other arrangements according to the principles of this invention may be devised by one skilled in the art without departing from the spirit and scope of this invention.

What is claimed is:

1. A magnetic memory circuit comprising a plurality of wire memory elements each having a helical flux path axially coincident therewith, said flux paths being of a material having a substantially rectangular hysteresis loop, a plurality of energizing solenoids coupled to said elements and defining a plurality of rows of information address segments thereon, said rows of address segments being separated by rows of buffer segments on said elements, a first plurality of conducting strip means inductively coupled respectively to said rows of address segments, a second plurality of conducting strip means inductively coupled respectively to said rows of buffer segments, means for connecting said first and second pluralities of strip means in series, means for applying a first biasing current to said serially connected first and second pluralities of strip means to magnetically bias each of said address segments to a first predetermined point in a saturation direction on said hysteresis loop and said buffer segments to a second predetermined point in a switching direction on said hysteresis loop, means for applying first half-select write current pulses to particular ones of said wire memory elements to generate first magnetomotive drives in said switching direction from said first and second predetermined points in the address and buffer segments, respectively, of said last-mentioned memory elements, and means for applying second half-select write current pulses to a selected one of said solenoids coincidentally with said first write current pulses to generate second magnetomotive drives in said switching direction in said address segments defined by said selected solenoid, said first and second magnetomotive drives combining to switch said last-mentioned address segments defined on said particular ones of said memory elements.

2. A magnetic memory circuit according to claim 1 further comprising means for selectively applying full-select read current pulses to said solenoids, and means for detecting flux switching in said wire memory elements.

3. A magnetic memory circuit comprising a plurality of magnetic wire memory elements each having a helical flux path axially coincident therewith, said flux paths being of a material having a substantially rectangular hysteresis loop, a plurality of energizing solenoids coupled to said elements and defining a coordinate array of information address segments thereon, each of said address segments being separated from an adjacent address segment by a buffer region on said elements, a plurality of flat conducting means inductively coupled to first coordinates of said buffer regions, means for applying a biasing current to said plurality of flat conducting means to magnetically bias said buffer regions to a predetermined point on said hysteresis loop, means including said wire memory elements for applying coincident half-select magnetomotive drives to said wire memory elements to drive the information address segments defined thereon to a first remanent point on said hysteresis loop representative of particular binary information bits and to cause a predetermined flux excursion from said predetermined point in the buffer regions defined thereon, means including said solenoids for applying magnetomotive read drives to said information address segments to switch said address segments to a second remanent point on said hysteresis loop, and means for detecting the switching of said address segments responsive to said read drives.

4. A magnetic memory circuit comprising a plurality of magnetic wire memory elements each having a helical flux path axially coincident therewith, said flux paths being of a material having a substantially rectangular hysteresis loop, a plurality of energizing solenoids coupled to said elements and defining a coordinate array of information address segments and separating buffer regions thereon, means for applying a constant magnetomotive drive to said buffer regions to bias said buffer regions to a predetermined point on said hysteresis loop, means including said solenoids for selectively applying first half-select magnetomotive drives to the information address segments defined by said solenoids, means including selected ones of said wire memory elements for applying second half-select magnetomotive drives to the information address segments and buffer regions defined by said selected wire memory elements coincidentally with said first half-select drives, said first and second half-select drives combining to switch selected information address segments of said array to a remanent point on said hysteresis loop representative of particular information bits and to cause uniform flux excursions from said predetermined point in the buffer regions on said selected wire memory elements, read means including said solenoids for selectively applying read magnetomotive drives to the information address segments defined by said solenoids, and output detection circuit means for detecting flux switching in said address segments and said buffer regions of said wire memory elements.

5. A magnetic memory circuit according to claim 4 in which said means for applying a constant magnetomotive drive to said buffer regions comprises a first plurality of conducting strip means inductively coupled to said first coordinates of address segments, a second plurality of conducting strip means inductively coupled to first coordinates of said buffer regions, means for serially connecting alternate ends of said first and second pluralities of conducting strip means in a zigzag pattern, and means for applying a first biasing current to said first and second pluralities of conducting strip means, said first biasing current applying a first magnetic bias to said address segments in a direction opposite to that of the magnetic bias applied to said buffer regions.

6. A magnetic memory circuit according to claim 5 also comprising means for applying a second biasing current to said wire memory elements to bias said buffer regions to a second predetermined point on said hysteresis loop, said second biasing current combining with said first biasing current to bias said information address segments to a predetermined operating point on said hysteresis loop.

7. A magnetic memory circuit according to claim 6 in which said first and second plurality of conducting strip means comprise the solid portions of a flat sheet having portions alternately cut away from opposite sides of said sheet parallel to said first coordinates of address segments.

8. In a magnetic memory array comprising a plurality of magnetic wire memory elements each having a helical flux path axially coincident therewith, each of said flux paths being of a material having a substantially rectangular hysteresis loop, said elements having rows and columns of information address segments and separating buffer segments defined thereon, said memory array being accessible by coincident half-select current pulses, the combination comprising means for applying a first biasing current to said wire memory elements to magnetically bias said address segments and said buffer segments in a saturation direction on said hysteresis loops, a first plurality of conducting strip means arranged in inductive coupling with said rows of address segments, a second plurality of conducting strip means arranged in inductive coupling with said rows of buffer segments, means for serially connecting alternate ends of said first and second pluralities of conducting strip means in a zigzag pattern, and means for applying a second biasing current to said first and second pluralities of conducting strip means to further magnetically bias said address segments in a saturation direction on said hysteresis loops and further magnetically bias said buffer segments in a switching direction on said hysteresis loops, the magnitudes of said first and second biasing currents being adjusted so that said address segments have a resultant bias to prevent flux switching responsive to single half-select current pulses and so that said buffer segments have a resultant bias to permit a predetermined flux switching responsive to single half-select current pulses.

References Cited in the file of this patent

UNITED STATES PATENTS

| | | |
|---|---|---|
| 2,041,147 | Preisach | May 19, 1936 |
| 2,945,217 | Fisher | July 12, 1960 |

OTHER REFERENCES

"Non-Destructive Sensing of Magnetic Cores," Buch & Frank, Communications and Electronics, pp. 822–830, January 1954.